United States Patent Office 2,998,454
Patented Aug. 29, 1961

2,998,454
SUBSTITUTED PHENYL BIPHENYLYL SULFONES AND THEIR PREPARATION
George M. Nichols, Pitman, N.J., assignor to E. I. du Pont de Nemours and Company, Wilmington, Del., a corporation of Delaware
No Drawing. Filed July 11, 1960, Ser. No. 41,778
6 Claims. (Cl. 260—607)

The present invention relates to novel substituted phenyl biphenylyl sulfones.

The new compounds of this invention are of the general formula

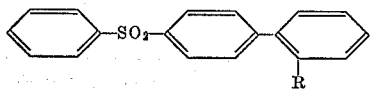

wherein R is selected from the group consisting of bromine, phenyl, and phenoxy radicals. The novel compounds are phenyl 2'-phenyl-4-biphenylyl sulfone, phenyl 2'-phenoxy-4-biphenylyl sulfone, and phenyl 2'-bromo-4-biphenylyl sulfone. Phenyl 2'-phenyl-4-biphenylyl sulfone are compounds possessing unusually wide liquid ranges combined with high thermal stability. For this reason, they are valuable as lubricants, hydraulic fluids, dielectric fluids, heat-transfer media, and speical-purpose additives, such as plasticizers for high-temperature materials. Among other uses, they are low-volatility, high-temperature, stable, liquid-phase solvents for gas chromatography. Phenyl 2'-bromo-4-biphenylyl sulfone is an intermediate in the preparation of phenyl 2'-phenoxy-4-biphenylyl sulfone.

I prefer to prepare phenyl 2'-bromo-4-biphenylyl sulfone and phenyl 2'-phenyl-4-biphenylyl sulfone by the reaction of 2-bromobiphenyl or o-terphenyl with benzenesulfonyl chloride in the presence of anhydrous aluminum chloride as a catalyst. To prepare phenyl 2'-phenoxy-4-biphenylyl sulfone, I prefer to react a 2'-bromo-4-biphenylyl sulfone with the potassium salt of phenol in the presence of a copper catalyst at elevated temperatures. Although the following examples illustrate these preferred methods, the preparation of the novel compounds is not limited to the specific embodiments set forth therein. Parts in the examples are parts by weight.

EXAMPLE 1

Preparation of phenyl 2'-bromo-4-biphenylyl sulfone

At room temperature, 84.4 parts of 2-bromobiphenyl and 46.4 parts of benzenesulfonyl chloride were mixed in a 300-ml., 3-necked, Pyrex flask fitted with thermometer, stirrer, and condenser. Sixty-five parts of anhydrous aluminum chloride powder was added to the mixture at 25° C. The reaction, accompanied by the evolution of hydrogen chloride gas, was conducted for 2 hours at 40° C. The thick, dark reaction mixture was then poured into warm water and stirred to decompose completely the dark sulfone-aluminum chloride complex. The product was extracted with 500 ml. of benzene and the solution was filtered. After the product was washed again with water and extracted with benzene, the extract was distilled. The distillate was then redistilled and 78.3 parts (58% conversion) of a yellow product was obtained. The product had a pour point of 52° C. and a boiling point of 230° C. at 0.10 mm. pressure. Infrared analysis of the product showed the presence of the sulfonyl linkage. The elemental analysis was as follows:

C ---------------------------------------- 59.47
H ---------------------------------------- 3.74
Br --------------------------------------- 21.66
S ---------------------------------------- 8.69

Calculated for $C_{18}H_{13}BrO_2S$: C, 57.92; H, 3.51; Br, 21.41; S, 8.59. The elemental content of the compound therefore agreed closely with that calculated for $$C_{18}H_{13}BrO_2S$$

Thus, it was established that the compound obtained according to this example was phenyl 2'-bromo-4-biphenylyl sulfone:

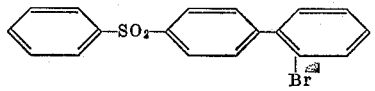

EXAMPLE 2

Preparation of phenyl 2'-phenoxy-4-biphenylyl sulfone

Potassium phenoxide (35 parts) and 5 parts of copper powder were mixed in a 500-ml., 3-necked, "Pyrex" flask fitted with thermometer, stirrer, and condenser, and heated to 210° C. While the mixture was maintained at a temperature between 200 and 230° C., 78.3 parts of the phenyl 2'-bromo-4-biphenylyl sulfone prepared in the process of Example 1 was added gradually. The reaction was continued with stirring for 2½ hours at 214° C. The mixture was then cooled to about 100° C., poured into 1 liter of 5% aqueous potassium hydroxide solution, extracted with three 400-ml. portions of benzene, and washed with two 500-ml. portions of 10% sodium sulfate solution. After the benzene was evaporated, the crude product was distilled and a yellow product was obtained. The product had a pour point of 55° C. and a boiling point of 545° C. at atmospheric pressure. Infrared analysis showed the presence of the sulfonyl linkage and ether linkage. The elemental analysis was as follows:

C ---------------------------------------- 74.86
H ---------------------------------------- 4.52
S ---------------------------------------- 7.89

Calculated for $C_{24}H_{18}O_3S$: C, 74.59; H, 4.70; S, 8.30. Thus, the compound obtained was phenyl 2'-phenoxy-4-biphenylyl sulfone:

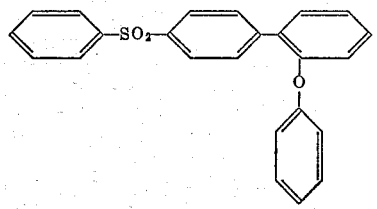

The compound underwent only a very slight change when it was placed in an evacuated, sealed "Pyrex" tube and subjected to a temperature of about 450° C. for 10 hours.

EXAMPLE 3

Preparation of phenyl 2'-phenyl-4-biphenylyl sulfone

Anhydrous aluminum chloride (100 parts) was added to a 500-ml., 3-necked, "Pyrex" flask containing a mixture of 115 parts of o-terphenyl and 64 parts of benzenesulfonyl chloride dissolved in 119.9 parts of nitrobenzene at room temperature. The reaction, accompanied by the evolution of hydrogen chloride gas, was conducted for one hour at 80° C. The reaction mixture was then poured into warm water and stirred to decompose completely the sulfone-aluminum chloride complex. The product was extracted with 500 ml. of benzene and the solution was filtered. After the benzene was evaporated on the steam bath, the crude product was distilled and 80 parts (43% conversion) of a yellow product was obtained. The product had a pour point of 80° C. and a boiling point of 506° C. at atmospheric pressure. Infrared analysis showed the presence of the sulfonyl linkage. The elemental analysis was as follows:

```
C _____ 77.25
H _____  4.93
S _____  8.61
```

Calculated for $C_{24}H_{18}O_2S$: C, 77.81; H, 4.90; S, 8.66. Thus, the compound obtained was phenyl 2′-phenyl-4-biphenylyl sulfone:

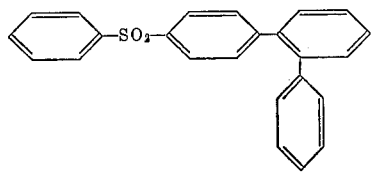

The compound exhibited no change when it was placed in an evacuated, sealed "Pyrex" tube and subjected to a temperature of about 450° C. for 10 hours.

As shown in Examples 1 and 3, phenyl 2′-bromo-4-biphenylyl sulfone and phenyl 2′-phenyl-4-biphenylyl sulfone may be prepared readily by the reaction of the appropriate aromatic hydrocarbon with benzenesulfonyl chloride in the presence of an anhydrous aluminum chloride catalyst. The reaction mixture is heated to a temperature sufficient to effect the reaction which is accompanied by the evolution of hydrogen chloride gas, and maintained at that temperature until the reaction is complete. In general, temperatures less than 85° C. are required. If it is desired, an organic solvent for the reaction mixture, e.g., nitrobenzene, may be used. It is essential that a Friedel-Crafts catalyst, preferably anhydrous aluminum chloride, be present in the reaction mixture. Because the aluminum chloride forms a complex with the sulfone product, the catalyst must be present in a greater than stoichiometric amount. Following the reaction, the mixture is washed with water, stirred sufficiently to decompose completely the sulfone-aluminum chloride complex, extracted in a common organic solvent, e.g., benzene, and rewashed with water to remove completely the water-soluble reaction products. After the solvent is evaporated, the residue is distilled and the pure compound is obtained.

Example 2 shows that phenyl 2′-phenoxy-4-biphenylyl sulfone can be prepared readily by the reaction of 2′-bromo-4-biphenylyl sulfone with the potassium salt of phenol in the presence of a copper catalyst at elevated temperatures. The potassium salt of phenol can be prepared prior to its reaction with the halogenated aryl sulfone, or it can be formed in the reaction mixture from phenol and potassium hydroxide. It is essential that copper powder be present as the catalyst. The copper is present in catalytic amounts, and, preferably, a greater than stoichiometric amount of potassium phenoxide is used. The reaction mixture is heated to a temperature sufficient to effect the reaction, and maintained at that temperature until the reaction is complete. I have found that temperatures in excess of 200° C. are required in order to provide a reasonable reaction time. After formation of the ether is complete, I prefer to cool the mixture in order to facilitate its addition to the potassium hydroxide solution. The reaction mixture is then extracted in benzene or another common organic solvent and rewashed with basic and salt solutions to remove completely water-soluble reaction products. After the solvent is evaporated, the residue is distilled and the pure compound is obtained.

All of the new compounds are soluble in most organic solvents and insoluble in water.

Phenyl 2′-phenoxy-4-biphenylyl sulfone and phenyl 2′-phenyl-4-biphenylyl sulfone are compounds that are relatively inert chemically, and thermally stable at a temperature of 450° C., as shown in the examples. The following table is a compilation of their pour points, boiling points, and liquid ranges, illustrative of the unusually wide liquid ranges possessed by these novel compounds. The pour point is the lowest temperature at which the compound will flow at atmospheric pressure in a 13 mm. test tube.

| Compound | Pour Point, °C. | Boiling Point, °C. | Liquid Range, °C. |
|---|---|---|---|
| Phenyl 2′-phenoxy-4-biphenylyl sulfone | 55 | 545 | 490 |
| Phenyl 2′-phenyl-4-biphenylyl sulfone | 80 | 506 | 426 |

The above combination of properties makes these compounds of considerable value as thermally stable liquids for various applications as set out heretofore.

The new compounds and their preparation have been described in detail in the foregoing. However, it will be obvious to those skilled in the art that modifications in their preparation are possible without departure from the scope of the invention. Therefore, I intend to be limited only by the following claims.

I claim:

1. A compound having the formula

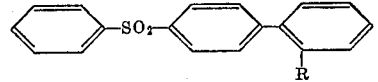

wherein R is selected from the group consisting of bromine, phenyl, and phenoxy radicals.

2. Phenyl 2′-bromo-4-biphenylyl sulfone.
3. Phenyl 2′-phenoxy-4-biphenylyl sulfone.
4. Phenyl 2′-phenyl-4-biphenylyl sulfone.
5. A process for preparing sulfones which comprises reacting benzenesulfonyl chloride with biphenyl having as a substituent on the 2 position a radical selected from the group consisting of bromine and phenyl in the presence of an anhydrous aluminum chloride catalyst.
6. A process for preparing phenyl 2′-phenoxy-4-biphenylyl sulfone which comprises reacting phenyl 2′-bromo-4-biphenylyl sulfone with the potassium salt of phenol in the presence of a copper catalyst at a temperature of 200 to 230° C.

References Cited in the file of this patent

UNITED STATES PATENTS 2,069,774    Reid _____ Feb. 9, 1937